US009015254B2

(12) United States Patent  
Brdiczka (10) Patent No.: US 9,015,254 B2  
(45) Date of Patent: Apr. 21, 2015

(54) METHOD AND SYSTEM FOR CALCULATING EMAIL AND EMAIL PARTICIPANT PROMINENCE

(75) Inventor: Oliver Brdiczka, Mountain View, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 664 days.

(21) Appl. No.: 13/253,895

(22) Filed: Oct. 5, 2011

(65) Prior Publication Data

US 2013/0091226 A1    Apr. 11, 2013

(51) Int. Cl.
 *G06F 15/16* (2006.01)
 *G06Q 10/10* (2012.01)
 *H04L 12/58* (2006.01)
 *G06Q 50/00* (2012.01)

(52) U.S. Cl.
 CPC ............... *G06Q 10/10* (2013.01); *H04L 51/18* (2013.01); *H04L 51/26* (2013.01); *G06Q 50/01* (2013.01)

(58) Field of Classification Search
 CPC ......... H04L 51/26; H04L 51/12; H04L 51/18; G06Q 10/10
 USPC ................................................ 709/207, 206
 See application file for complete search history.

(56) References Cited

U.S. PATENT DOCUMENTS

| | | | |
|---|---|---|---|
| 6,832,244 B1 * | 12/2004 | Raghunandan | 709/206 |
| 7,752,279 B2 | 7/2010 | Hardy | |
| 7,844,666 B2 | 11/2010 | Horvitz | |
| 8,032,602 B2 * | 10/2011 | Lavoie et al. | 709/206 |
| 8,307,043 B2 * | 11/2012 | Runstedler et al. | 709/206 |
| 8,713,027 B2 * | 4/2014 | Forutanpour et al. | 707/748 |
| 2007/0168430 A1 | 7/2007 | Brun | |
| 2008/0005249 A1 | 1/2008 | Hart | |
| 2009/0254629 A1 | 10/2009 | Bruce | |
| 2010/0211644 A1 | 8/2010 | Lavoie | |
| 2012/0150979 A1 * | 6/2012 | Monaco | 709/206 |

OTHER PUBLICATIONS

Ayodele, T. et al., "Applying Machine Learning Techniques for Email Reply Prediction", Proceedings of the World Congress on, 2009.
Dabbish, L.A. et al., "Understanding email use: predicting action on a message", Proceedings of the SIGCHI conference on Human factors in computing systems, 2005, p. 691-700.
Dredze, M. et al., "Reply expectation prediction for email management", The Second Conference on Email, 2005.
Dredze, M. et al., "Intelligent email: Reply and attachment prediction", On Intelligent User, 2008, p. 321-324.
Neustaedter, C. et al., "The social network and relationship finder: Social sorting for email triage", on Email and Anti-Spam, 2005.

(Continued)

*Primary Examiner* — Kristie Shingles
(74) *Attorney, Agent, or Firm* — Shun Yao; Park, Vaughan, Fleming & Dowler LLP (57) ABSTRACT

One embodiment of the present invention provides a system for calculating prominence of an email with regard to a user. During operation, the system determines an importance value associated with an email participant in the user's conversations, wherein the email participant is an email sender and/or recipient other than the user. Next, the system calculates a prominence value associated with a received email based upon at least the importance values associated with the email participants in the received email.

19 Claims, 6 Drawing Sheets

(56) References Cited

OTHER PUBLICATIONS

Venolia, G. et al., "Supporting email workflow", Microsoft Research, 2001.

Yoo, S. et al., "Mining social networks for personalized email prioritization" Proceedings of the 15th ACM SIGKDD International Conference on Knowledge discovery and data mining—KDD 2009.

* cited by examiner

METHOD AND SYSTEM FOR CALCULATING EMAIL AND EMAIL PARTICIPANT PROMINENCE

BACKGROUND

1. Field

This disclosure is generally related to email processing. More specifically, this disclosure is related to calculating prominence values of emails and email participants.

2. Related Art

Email has become an indispensable part of today's information economy. Employees often spend a substantial part of their workday plodding through mountains of email messages whose subject matter can range from the utterly trivial to the extremely important. A fair amount of research has investigated how people perceive the importance of email and email senders/receivers.

One technique to evaluate email importance is based on user surveys and feedback collected from users on their actions taken on the emails, such as response and attachment. This technique is derived from the finding that perceived email importance and reply probability are related to each other. Early results give a good indication of correlations between specific factors and perceived importance. Although a linear regression model for showing correlations can be used for the prediction, the input factors (e.g., "Action request") are hand-labeled and their derivation is not automatic.

Some recent work has proposed approaches for email prioritization based on automatically derived social network information. For example, an email message from a sender may be assigned a high importance if the recipient frequently receives emails from the sender. However, this technique based on social network features requires a sufficient amount of emails and calculation resources to derive higher-level social network features.

SUMMARY

One embodiment of the present invention provides a system for calculating prominence of an email with regard to a user. During operation, the system determines an importance value associated with an email participant in the user's conversations, wherein the email participant is an email sender and/or recipient other than the user. Next, the system calculates a prominence value associated with a received email based upon at least the importance values associated with the email participants in the received email.

In a variation on this embodiment, the importance value associated with the email participant and the prominence value associated with a received email are between zero and one, wherein zero indicates the lowest importance and one indicates the highest importance.

In a variation on this embodiment, the system determines the importance value associated with the email participant by determining a conversation weight for the email participant subject to a decay corresponding to an amount of time since a previous email was sent to or received by the email participant.

In a further variation, the system determines the conversation weight for the email participant by determining a number of conversations in which both the email participant and the user have participated.

In a further variation, the system determines the conversation weight for the email participant in each conversation by determining one or more of: a recipient weight indicating a number of recipients in the conversation other than the user and the email participant, a contribution weight indicating the number of emails sent by the email participant in the conversation, and a temporal weight indicating an average duration between messages in the conversation.

In a variation on this embodiment, the system calculates the prominence value associated with the received email by determining one or more of: an importance value associated with the sender, an average of the importance values associated with the recipients other than the user, a timestamp of the email, a domain name of the email sender, and additional email features including direct address, request, attachment, and scheduling information contained in the received email.

In a variation on this embodiment, the system allows the user to inspect and modify the prominence value associated with a received email.

In a variation on this embodiment, the system applies machine-learning techniques by examples to determine the importance value associated with the email participant and calculate the prominence value associated with the received email.

In a variation on this embodiment, the system allows the user to customize the calculation of the prominence value by providing feedback and/or by inspecting one or more factors used for calculating the prominence value.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a solution for calculating prominence or importance values associated with emails and email participants with regard to a user. In one embodiment of the present invention, the email-prominence calculation system first determines an importance value associated with an email participant in the user's conversations, wherein the email participant is an email sender and/or recipient other than the user. Next, the system calculates a prominence value associated with a received email based upon at least the importance values associated with the email participants in the received email.

Conventional methods to determine email prominence have relied on user surveys and feedback on the actions taken on the emails, such as response and attachment. This technique is derived from the finding that perceived email importance and reply probability are related to each other. However, it is often hard to derive operational formulas to calculate email prominence from such approaches. Some recent work has proposed approaches for email prioritization based on automatically derived social network information, which require a large amount of emails and calculation resources to derive higher-level social network features. To overcome these issues, an email-prominence calculation method is proposed in embodiments of the present invention to provide an operational formula that incorporates both email-specific features and simple social network cues. In this disclosure, the terms "prominence" and "importance" are used inter-changeably.

Figure 1:
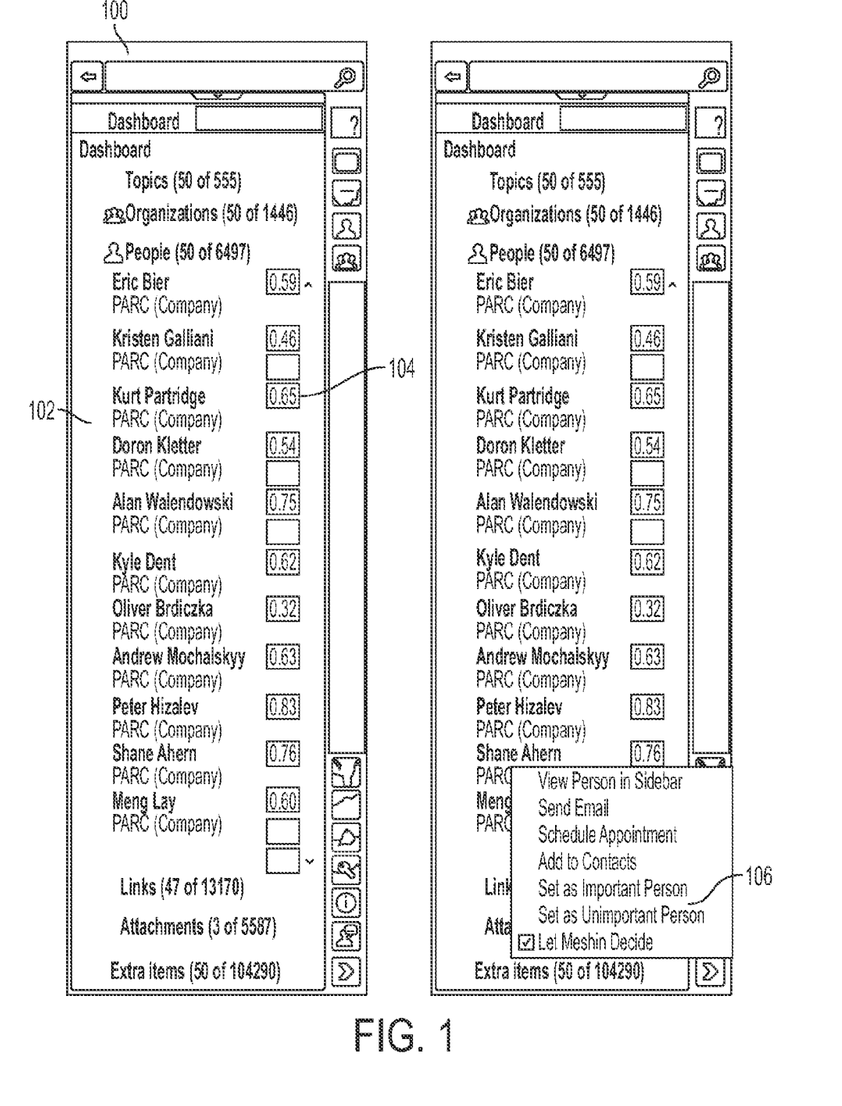
FIG. 1 presents a diagram illustrating an exemplary user interface showing importance values associated with email participants in accordance with an embodiment of the present invention.

The email-prominence calculation system also provides a graphic user interface that allows the user to inspect and modify the prominence values associated with email participants as well as the received emails from the participants. FIG. 1 presents a diagram illustrating such an exemplary user interface 100 showing importance values associated with email participants in accordance with an embodiment of the present invention. The importance values associated with the email participants are shown on the right side of the participants' names in a "people" list in user interface 100. For example, user 102 is associated with an importance value 104 which is 0.65. In this example, the importance value is defined between zero and one, with zero indicating the lowest importance and one indicating the highest importance. A popup menu 106 can be invoked by the user to manually set an email participant as important or unimportant. In the example, the default option is selected to let the system decide the importance value automatically.

Figure 2:
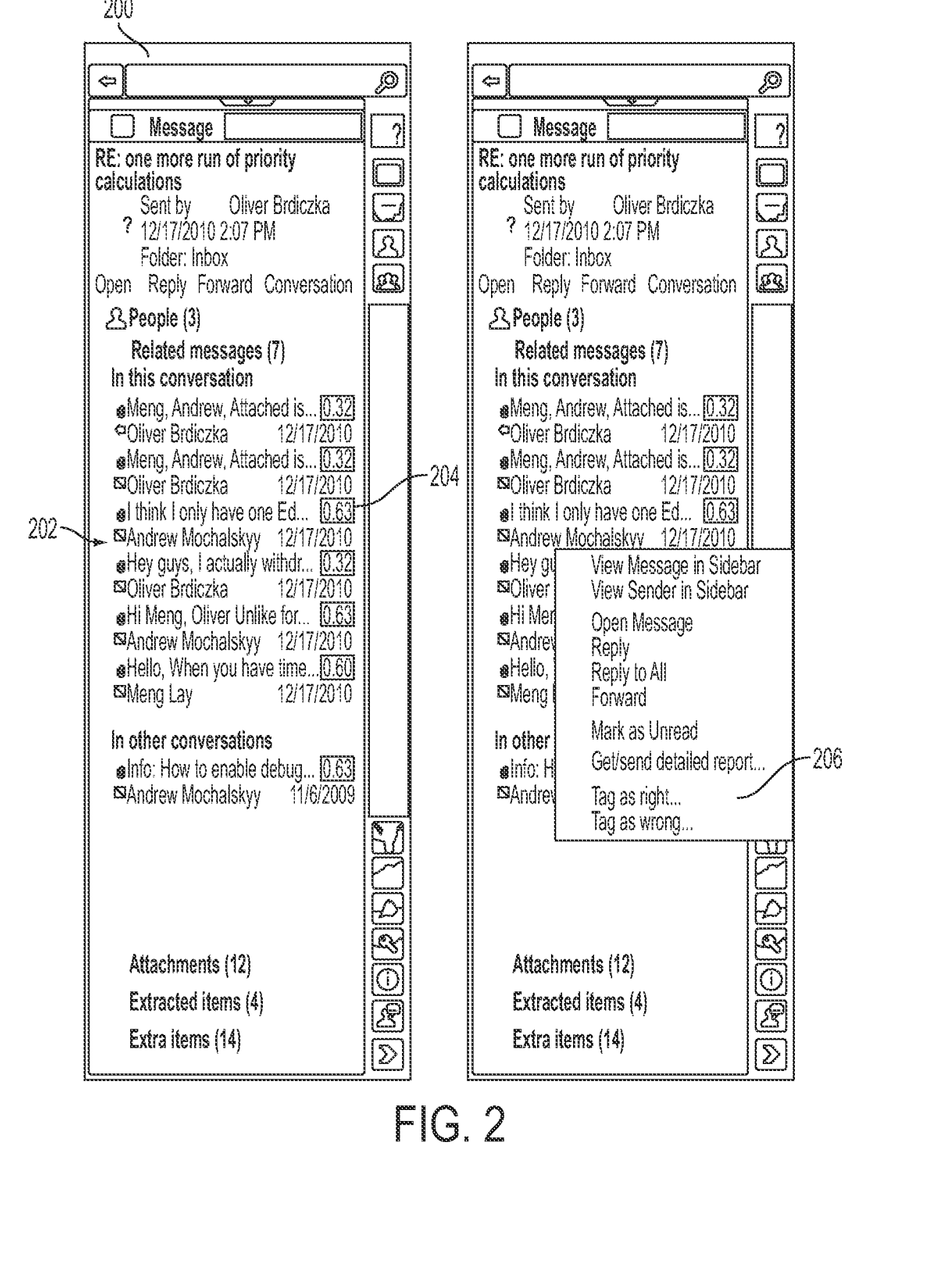
FIG. 2 presents a diagram illustrating an exemplary user interface showing prominence values associated with emails in accordance with an embodiment of the present invention.

FIG. 2 presents a diagram illustrating an exemplary user interface 200 showing prominence values associated with emails in accordance with an embodiment of the present invention. The prominence values associated with the emails are shown on the right side of the first lines of the emails in a "related messages" list in user interface 200. For example, email 202 is associated with a prominence value 204 which is 0.63. Similarly, the prominence value is defined between zero and one, with zero indicating the lowest prominence and one indicating the highest prominence. A popup menu 206 can be invoked by the user to inform the system whether the prominence calculation is correct or not.

Figure 3:
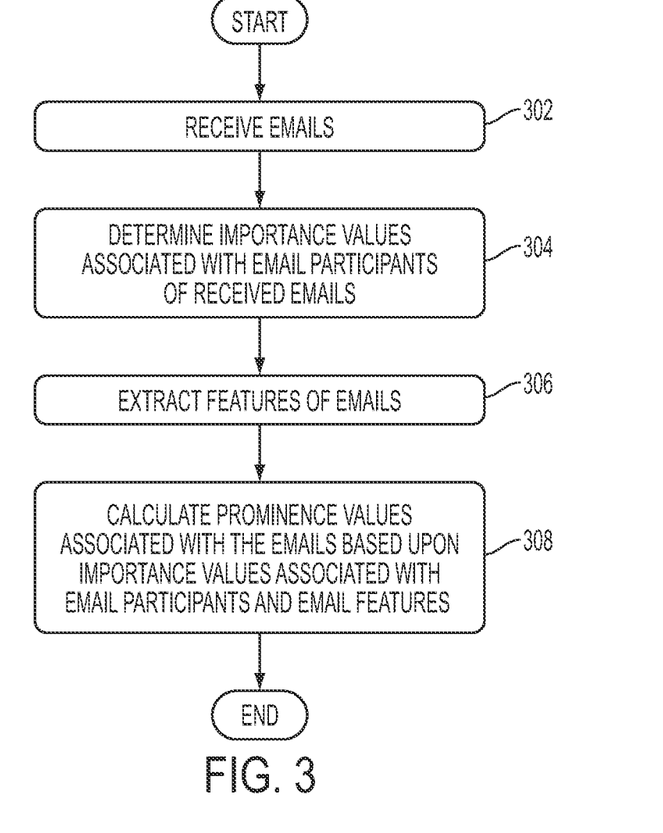
FIG. 3 presents a flowchart illustrating the process of calculating email and email participant prominence in accordance with an embodiment of the present invention.

FIG. 3 presents a flowchart illustrating the process of calculating email and email participant prominence in accordance with an embodiment of the present invention. During operation, the system receives emails (operation 302). Next, the system determines the importance values associated with the email participants of the received emails (operation 304). The system then extracts features of the emails (operation 306). Subsequently, the system calculates the prominence values associated with the emails based upon the importance values associated with the email participants and extracted email features (operation 308).

Importance of Email Participants

In embodiments of the present invention, the system calculates the importance value of an email participant based on the number of conversations in which the participant has been involved and the contributions the participant has made. The email participants could be chosen from the email senders and recipients associated with a user's email account. It is assumed that the user's email has been organized into conversations, with each conversation consisting of email communications under a separate topic. To derive a higher-level communicative model and simplify the processing, a participant's conversation weight is calculated based on his/her activity in the conversations. The importance value associated with an email participant is then defined as the participant's decayed conversation weight.

The formula for calculating the importance value relies on the following definitions and parameters:

ep: an email participant with regard to a user's email inbox;

conv(ep): a conversation in which both the email participant and the user are the recipient of at least one message, and both the participant and the user send at least one message. In other words, both the email participant and the user have participated in the conversation;

rw(c): recipient weight of a conversation c. The recipient weight can be defined as $rw(c)=\exp(-(p-2)\cdot\alpha)$, where p is the number of recipients in the conversation c(p-2 means to exclude the user and the email participant), and $0 \leq \alpha \leq 1$ is a decay constant;

cw(c): contribution weight of a conversation c. The contribution weight can be defined as a ratio between the number of email messages the participant sends out over the total number of email messages in the conversation c; and tw(c): temporal weight of a conversation c. The temporal weight can be defined as $tw(c)=\exp(-(d-1)\cdot\beta)$, where d is the average time duration between messages inside the conversation c. For example, d could be the number of days between messages.

Based on the above definitions and parameters, a conversation weight cw for an email participant ep can be defined as:

$$cw(ep)=\max[init(ep),F(ep)],$$

where $$F(ep) = \frac{1}{sizeof(conv(ep))} \sum_{c \in conv(ep)} rw(c) \cdot cw(c) \cdot tw(c),$$

$init(ep)=I_0 e^{-m\delta_0}$ if ep's domain is the same as the user's,
$init(ep)=I_1 e^{-m\delta_1}$ if ep's domain is of other companies, and
$init(ep)=I_2 e^{-m\delta_2}$ otherwise, and m is the number of emails received by the email participant ep. The initial conversation weight init(ep) is assigned based on the participant's domain to bootstrap a new email participant with a reasonable importance values. In the definition of the conversation weight, a maximum operation between init (ep) and F(ep) ensures that if the conversation count for an email participant increases to 1, the conversation weight equals F(ep) so that more frequent email exchanges do not adversely affect the importance of the email participant.

Finally, the importance value I(ep) associated with the email participant ep is defined as the decayed conversation weight of email participants:

$$I(ep)=e^{-\gamma t}cw(ep)$$

where t is the amount of time since a previous email was sent to or received by the email participant, and γ is the decay constant. Exemplary constant parameters could be set to $\alpha=0.01$, $\beta=0.01$, $\gamma=0.00223143$, $I_0=0.5$, $I_1=0.4$, $I_2=0.3$, and $\delta_1=\delta_2=\delta_3=0.13862944$.

Figure 4:
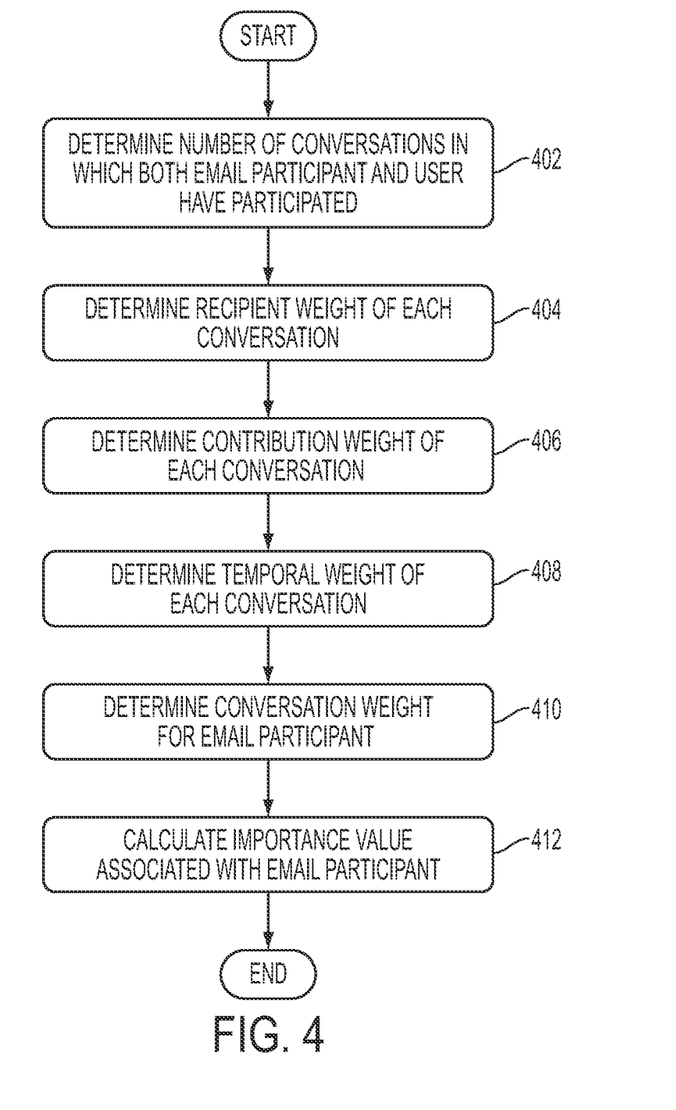
FIG. 4 presents a flowchart illustrating the process of determining importance values associated with email participants in accordance with an embodiment of the present invention.

FIG. 4 presents a flowchart illustrating the process of determining importance values associated with email participants in accordance with an embodiment of the present invention. During operation, the system first determines the number of conversations in which both the email participant and the user have participated (operation 402). Next, the system determines the recipient weight (operation 404), contribution weight (operation 406), and temporal weight (operation 408) of each conversation. The system then determines the conversation weight for the email participant (operation 410). The system subsequently calculates the importance value associated with the email participant based on the conversation weight (operation 412).

Prominence of Emails

In embodiments of the present invention, the system calculates prominence values associated with a received email based on the importance values associated with the email participants and extracted email features. The importance values and extracted email features include: the importance value associated with the email sender, the average of the importance values associated with the email recipients other than the user, the timestamp of the email, the domain name of the email sender; and additional email features, such as direct address, request, attachment, and scheduling information contained in the received email. The formula for calculating the prominence value P(m) associated with email m is defined as:

$$P(m)=s(m) \cdot r(m) \cdot rc(m) \cdot c(m) \cdot d(m) \cdot sd(m).$$

where the parameters used in the formula are:
  s(m): the importance value associated with the email sender;
  r(m): the average of the importance values associated with the email recipients other than the user;
  rc(m): the recipient configuration,
  a) $rc(m)=\exp(-(p-1) \cdot \alpha_{TO})$ if the user's email address appears in the "TO" field of the email header; and
  b) $rc(m)=\exp(-(p-1) \cdot \alpha_{CC})$ if the user's email address appears in the "CC" field of the email header;
  where p is the number of recipients in the email, and $0 \leq \alpha_{TO}, \alpha_{CC} \leq 1$;
  c(m): additional email features, defined as follows:

$$c(m) = \max\left(\min\left(\frac{da + re + at + sc}{3}, 1.0\right), 0.25\right)$$

where
  a) $da \in \{0,1\}$ is a binary indicator which refers to direct address. da=1 if the user's name is directly addressed in the email; otherwise, da=0. To determine whether the user's name is directly addressed, the email body can be scanned. For example, the user's first name may appear in the beginning of the email body, or the user's first and last names may appear in the middle of the email body;
  b) $re \in \{0,1\}$ is a binary indicator which refers to request. re=1 if the email contains a request to the user; otherwise, re=0. To determine whether the email contains a request to the user, the email can be parsed using automatic part of speech (POS) tagging and regular express matching. The process involves separating the email into sentences with a machine learning (ML) or regular expression based sentence detector. Next, the POS tagging is applied to each sentence. The resulting POS tags are input to a question detector to detect questions or requests with matching structures;
  c) $at \in \{0,1\}$ is a binary indicator which refers to attachment. at=1 if the email contains a significant attachment; otherwise, at=0. A size threshold may be selected to avoid including signature files as a significant attachment; and
  d) $sc \in \{0,1\}$ is a binary indicator which refers to scheduling information. sc=1 if the email contains scheduling information; otherwise, sc=0. To determine whether the email contains scheduling information, the semantic entity detection can be applied to the email content. The scheduling information can be identified if date or time entities exist in the email, or the type of the email is appointment type.
  c(m)=1 if any three of the indicators are positive, and c(m)=0.25 if none of the indicators is positive.
  d(m): the decay corresponding to the amount of time since the email has been sent. For example, the decay can be defined corresponding to the number of days since the email has been sent:

$$d(m)=\exp(-(\#days) \cdot \delta).$$

Other time granularity is also possible; and
  sd(m): the sender's domain. For example, sd(m)=1.0 if the sender's domain name is the same as the user's, sd(m)=0.75 if the sender's domain name is of a known company, and sd(m)=0.5 if the sender's domain name is of unknown company or from a general email service provider. Other values for the domain parameter are also possible.

Figure 5:
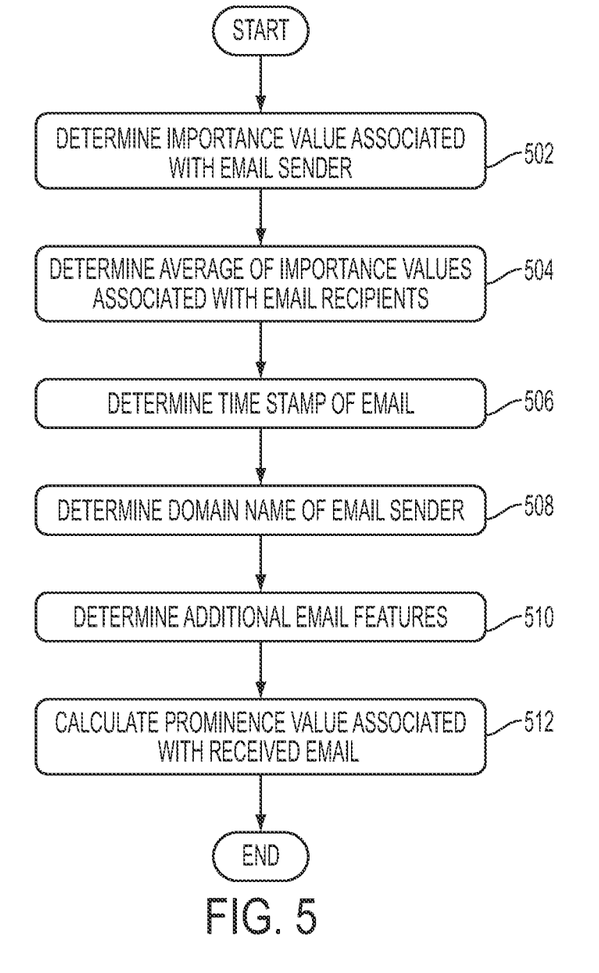
FIG. 5 presents a flowchart illustrating the process of calculating prominence values associated with emails in accordance with an embodiment of the present invention.

FIG. 5 presents a flowchart illustrating the process of calculating prominence values associated with emails in accordance with an embodiment of the present invention. During operation, the system first determines the importance value associated with the email sender (operation 502), and the average of the importance values associated with the email recipients excluding the user (operation 504). Next, the system determines the timestamp of the email (operation 506) and domain name of the email sender (operation 508). The system then determines additional email features, such as direct address, request, attachment, and scheduling information contained in the received email (operation 510). The system subsequently calculates the prominence value associated with the received email (operation 512).

Optimization and Customization

In one embodiment, the system can apply supervised machine learning to calculate the importance values associated with the email participants and the prominence values associated with the received emails. Supervised learning is the task of inferring algorithm parameters from supervised training data consisting of a set of training examples. In order to improve the prominence calculation, the system collects user feedback which indicates whether non-important emails or email participants are falsely included, and/or whether important emails or email participants are mistakenly omitted. The user feedback provides training data for the supervised machine learning, so that the supervised machine-learning algorithm may analyze the user feedback and infer a better set of parameters for calculation. The inferred classification rules can be used in calculating prominence values for future emails and email participants.

A supervised learning algorithm analyzes the training data to extract features or properties of the data, and improve the existing formula. More details on supervised machine learning are available in the documentation available from publicly available literature, such as "Introduction to Machine Learning," by Ethem Alpaydin, 2nd Ed., The MIT Press, 2010, the disclosure of which is incorporated by reference in its entirety herein.

Customization in calculating prominence values is also feasible utilizing user's feedback. User contextual information such as user location, social context from emails, time information, and user tasks can also be applied to further customize the calculation. For example, a graphic user interface can be provided for the user to inspect the factors introduced to the formula and to specify customized weights for each factor. In contrast to the training by example method, a white box GUI-based refinement to the initial formula allows the user to quickly customize and improve prominence calculation results, which can accelerate the adoption process.

Exemplary Computer System

Figure 6:
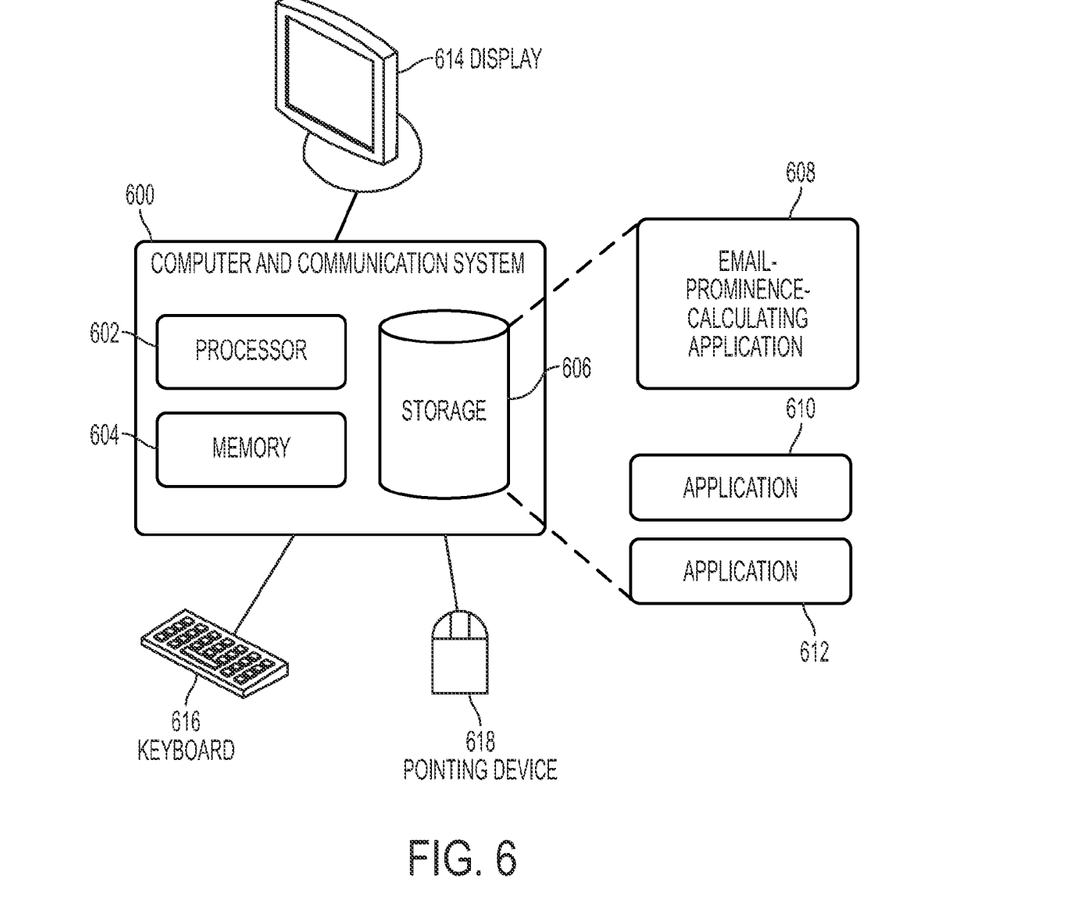
FIG. 6 illustrates an exemplary computer system for calculating email and email participant prominence in accordance with one embodiment of the present invention.

FIG. 6 illustrates an exemplary computer system for estimating document similarity in accordance with one embodiment of the present invention. In one embodiment, a computer and communication system 600 includes a processor 602, a memory 604, and a storage device 606. Storage device 606 stores an email-prominence-calculating application 608, as well as other applications, such as applications 610 and 612. During operation, email-prominence-calculating application 608 is loaded from storage device 606 into memory 604 and then executed by processor 602. While executing the program, processor 602 performs the aforementioned functions. Computer and communication system 600 is coupled to an optional display 614, keyboard 616, and pointing device 618.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for calculating prominence of an email with regard to a user, the method comprising:

computing, by a computer, a decay factor $e^{-t\gamma}$ associated with an e-mail participant ep, wherein t is the amount of time since a previous email was sent to or received by the email participant, $\gamma$ is a decay constant, and the email participant is an entail sender and/or recipient other than the user;

computing a conversation weight cw(ep) associated with the email participant;

computing an importance value I(ep) associated with the email participant by determining a decayed conversation weight for the email participant according to an equation $I(ep)=e^{-t\gamma}cw(ep)$; and subsequent to computing the importance value, calculating a prominence value associated with a received email based upon the computed importance value associated with the email participant in the received email.

2. The method of claim 1, wherein cw(ep) is a conversation weight for the email participant ep defined as:

$$cw(ep)=\max[\text{init}(ep),F(ep)];$$

wherein:

$$F(ep) = \frac{1}{sizeof(conv(ep))} \sum_{c \in conv(ep)} rw(c) \cdot cw(c) \cdot tw(c),$$

init(ep) is assigned based on the email participant's domain, rw(c) is a recipient weight of a conversation c, cw(c) is a contribution weight of the conversation c, tw(c) is a temporal weight of the conversation c, and conv(ep) is a conversation in which both the email participant ep and the user are the recipient of at least one message and both the email participant ep and the user send at least one message.

3. The method of claim 1, wherein the importance value associated with the email participant and the prominence value associated with a received email are between zero and one, wherein zero indicates the lowest importance and one indicates the highest importance.

4. The method of claim 1, wherein computing the conversation weight for the email participant comprises determining a number of conversations in which both the email participant and the user have participated.

5. The method of claim 1, wherein computing the conversation weight for the email participant in each conversation comprises determining one or more of:

a recipient weight indicating a number of recipients in the conversation other than the user and the email participant;

a contribution weight indicating the number of emails sent by the email participant in the conversation; and a temporal weight indicating an average duration between messages in the conversation.

6. The method of claim 1, wherein calculating the prominence value associated with the received email comprises determining one or more of:

an importance value associated with the sender;

an average of the importance values associated with the recipients other than the user;

a timestamp of the email;

a domain name of the email sender; and additional email features including direct address, request, attachment, and scheduling information contained in the received email.

7. The method of claim 1, further comprising:
allowing the user to inspect and modify the prominence value associated with a received email.

8. The method of claim 1, further comprising:
applying machine-learning techniques by examples to compute the importance value associated with the email participant and calculate the prominence value associated with the received email.

9. The method of claim 1, further comprising allowing the user to customize the calculation of the prominence value by providing feedback and/or by inspecting one or more factors used for calculating the prominence value.

10. A non-transitory computer-readable storage medium storing instructions that when executed by a computer cause the computer to perform a method for calculating prominence of an email with regard to a user, the method comprising:
computing a decay factor $e^{-t\gamma}$ associated with an e-mail participant ep, wherein t is the amount of time since a previous email was sent to or received by the email participant, $\gamma$ is a decay constant, and the email participant is an email sender and/or recipient other than the user;
computing a conversation weight cw(ep) associated with the email participant;
computing an importance value I(ep) associated with the email participant by determining a decayed conversation weight for the email participant according to an equation $I(ep)=e^{-t\gamma}cw(ep)$; and
subsequent to computing the importance value, calculating a prominence value associated with a received email based upon the computed importance value associated with the email participant in the received email.

11. The computer-readable storage medium of claim 10, wherein the importance value associated with the email participant and the prominence value associated with a received email are between zero and one, wherein zero indicates the lowest importance and one indicates the highest importance.

12. The computer-readable storage medium of claim 10, wherein computing the conversation weight for the email participant comprises determining a number of conversations in which both the email participant and the user have participated.

13. The computer-readable storage medium of claim 10, wherein computing the conversation weight for the email participant in each conversation comprises determining one or more of:
a recipient weight indicating a number of recipients in the conversation other than the user and the email participant;
a contribution weight indicating the number of emails sent by the email participant in the conversation; and
a temporal weight indicating an average duration between messages in the conversation.

14. The computer-readable storage medium of claim 10, wherein calculating the prominence value associated with the received email comprises determining one or more of:
an importance value associated with the sender;
an average of the importance values associated with the recipients other than the user;
a timestamp of the email;
a domain name of the email sender; and
additional email features including direct address, request, attachment, and scheduling information contained in the received email.

15. The computer-readable storage medium of claim 10, wherein the method further comprises:
allowing the user to inspect and modify the prominence value associated with a received email.

16. The computer-readable storage medium of claim 10, wherein the method further comprising:
applying machine-learning techniques by examples to compute the importance value associated with the email participant and calculate the prominence value associated with the received email.

17. The computer-readable storage medium of claim 10, wherein the method further comprises allowing the user to customize the calculation of the prominence value by providing feedback and/or by inspecting one or more factors used for calculating the prominence value.

18. A system for calculating prominence of an email with regard to a user, the system comprising:
a decay factor computing mechanism configured to compute a decay factor $e^{-t\gamma}$ associated with an e-mail participant ep, wherein t is the amount of time since a previous email was sent to or received by the email participant, $\gamma$ is a decay constant, and the email participant is an email sender and/or recipient other than the user;
a weight-computing mechanism configured to compute a conversation weight cw(ep) associated with the email participant;
an importance-value computing mechanism configured to compute an importance value I(ep) associated with the email participant by determining a decayed conversation weight for the email participant according to an equation $I(ep)=e^{-t\gamma}cw(ep)$; and
a calculation mechanism configured to, subsequent to computing the importance value, calculate a prominence value associated with a received email based upon the computed importance value associated with the email participant in the received email.

19. The system of claim 18, wherein the importance value associated with the email participant and the prominence value associated with a received email are between zero and one, wherein zero indicates the lowest importance and one indicates the highest importance.

* * * * *